(12) United States Patent
Hsieh

(10) Patent No.: US 7,368,647 B2
(45) Date of Patent: May 6, 2008

(54) SUPPORT FOR A MUSICAL KEYBOARD INSTRUMENT

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 186 days.

(21) Appl. No.: 11/297,466

(22) Filed: Dec. 9, 2005

(65) Prior Publication Data

US 2007/0131091 A1    Jun. 14, 2007

(51) Int. Cl.
*G10G 5/00* (2006.01)

(52) U.S. Cl. .................. 84/327; 84/423 R; 84/425; 248/431; 248/164; 248/166

(58) Field of Classification Search ............... 248/164, 248/166
See application file for complete search history.

(56) References Cited

U.S. PATENT DOCUMENTS

| | | | | |
|---|---|---|---|---|
| 349,678 A * | 9/1886 | Applegate | ............... | 403/300 |
| 3,498,223 A * | 3/1970 | Andersson et al. | ........ | 102/221 |
| 4,602,889 A * | 7/1986 | Mu-Shan | .................. | 403/91 |
| 4,890,950 A * | 1/1990 | Yoo | ............... | 403/96 |
| 4,917,341 A * | 4/1990 | Pirchio | .................. | 248/164 |
| 5,105,517 A * | 4/1992 | Barnow | .................. | 29/401.1 |
| 5,199,930 A * | 4/1993 | Weber | .................. | 482/17 |
| 5,353,892 A * | 10/1994 | Lu | .................. | 182/163 |
| 5,358,204 A * | 10/1994 | Terada | .................. | 248/164 |
| 5,467,953 A * | 11/1995 | Malizia | .................. | 248/166 |
| 5,620,272 A * | 4/1997 | Sheng | .................. | 403/96 |
| 5,857,649 A * | 1/1999 | Eason | .................. | 248/164 |
| 5,860,511 A * | 1/1999 | Ensch et al. | ............ | 198/836.3 |
| 5,984,245 A * | 11/1999 | Hsu | .................. | 248/164 |
| 6,003,662 A * | 12/1999 | McCaffrey et al. | ...... | 198/836.3 |
| 6,563,035 B2 * | 5/2003 | Hsieh | .................. | 84/327 |
| 6,766,995 B1 * | 7/2004 | Hsieh | .................. | 248/404 |
| 6,792,993 B1 * | 9/2004 | Forbes | .................. | 160/67 |
| 6,918,855 B2 * | 7/2005 | Dumont | .................. | 482/51 |
| 6,923,416 B1 * | 8/2005 | Hsieh | .................. | 248/431 |
| 7,081,081 B2 * | 7/2006 | Schutz et al. | ............ | 494/12 |
| 2005/0173609 A1 * | 8/2005 | Hsieh | .................. | 248/431 |
| 2006/0185495 A1 * | 8/2006 | Hsieh | .................. | 84/327 |
| 2007/0131091 A1 * | 6/2007 | Hsieh | .................. | 84/423 R |

* cited by examiner

*Primary Examiner*—Lincoln Donovan
*Assistant Examiner*—Robert W Horn
(74) *Attorney, Agent, or Firm*—Rabin & Berdo, P.C.

(57) ABSTRACT

A support for a musical keyboard instrument has a first leg, a second leg and an adjuster. The first leg is pivotally connected to the second leg and a rod is formed in a sidewall of the second leg. Two first spiral surfaces are respectively formed in a free end of the rod and the adjuster is provided adjacent to the rod. The knob is formed on the adjuster and has two second spiral surfaces respectively formed thereon and mated with the first spiral surfaces. When the second spiral surfaces are locked by the first spiral surfaces, the first leg can be adjusted relative to the second leg. When the first spiral surfaces are engaged with the second spiral surfaces, the fist leg is secured in position on the second leg.

5 Claims, 6 Drawing Sheets

SUPPORT FOR A MUSICAL KEYBOARD INSTRUMENT

BACKGROUND OF THE INVENTION

1. Field of the Invention

The present invention relates to a support for a musical keyboard instrument, and more particularly to a support with which it is easy for a user to adjust the height of the musical instrument.

2. Description of the Related Art

At present, when a performer plays a musical instrument, it is usually provided on a support so that the musical instrument can be positioned at a desired height for the performer to use.

With reference to FIG. 6, a conventional support for a musical keyboard instrument is composed of a first leg (5) and a second leg (6). A middle portion of the first leg (5) is pivotally connected to that of the second leg (6). A disk (61) is securely mounted on the middle portion of the second leg (6) between the first and the second legs (5, 6). Multiple holes (62) are respectively and evenly defined along a periphery of the disk (61) in a radial pattern. A knob (51) is pressed by a spring (52) and a rod (not numbered) is provided on a first end of the knob (51) and can be engaged in the holes (62).

When used, the user pulls the knob (51) on the second end opposite the first end so that the rod detaches from one of the holes (62). Hence, the first leg (5) can be adjusted relative to the second leg (6) so that the conventional support for a musical keyboard instrument can be adjusted to a desired height to suit the user.

However, the rod cannot be positioned in the first leg (5) when withdrawn from the hole (62) to adjust the conventional support. It is difficult for just one user to adjust the conventional support when the knob (51) must always be pulled to keep the rod out of the hole (62).

Therefore, the invention provides a support for a musical keyboard instrument to mitigate or obviate the aforementioned problems.

SUMMARY OF THE INVENTION

The main objective of the present invention is to provide a support for a musical keyboard instrument, which can be adjusted conveniently by just one user.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
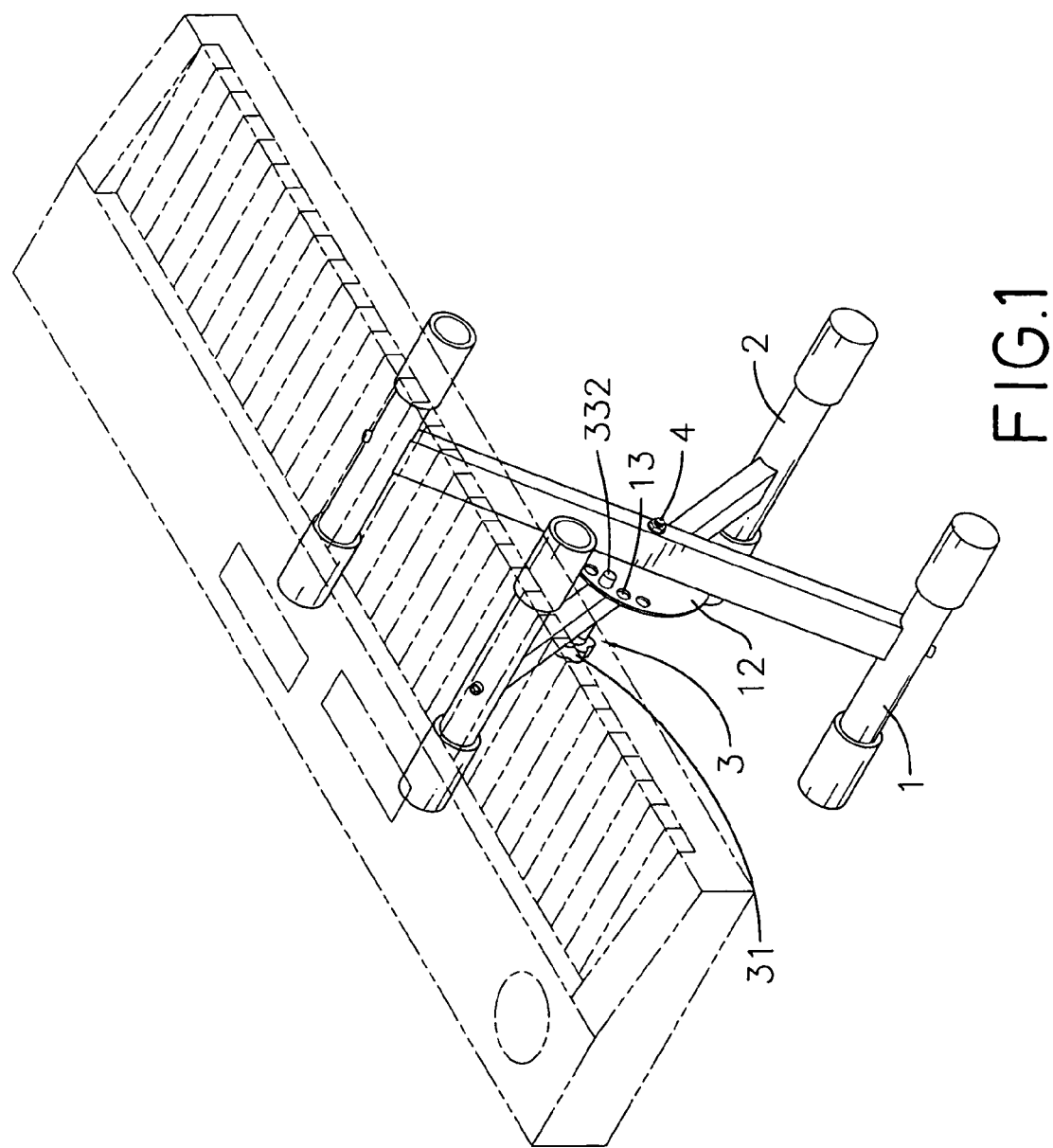
FIG. 1 is an operational perspective view of a support for a musical keyboard instrument in accordance with the present invention.
Figure 2:
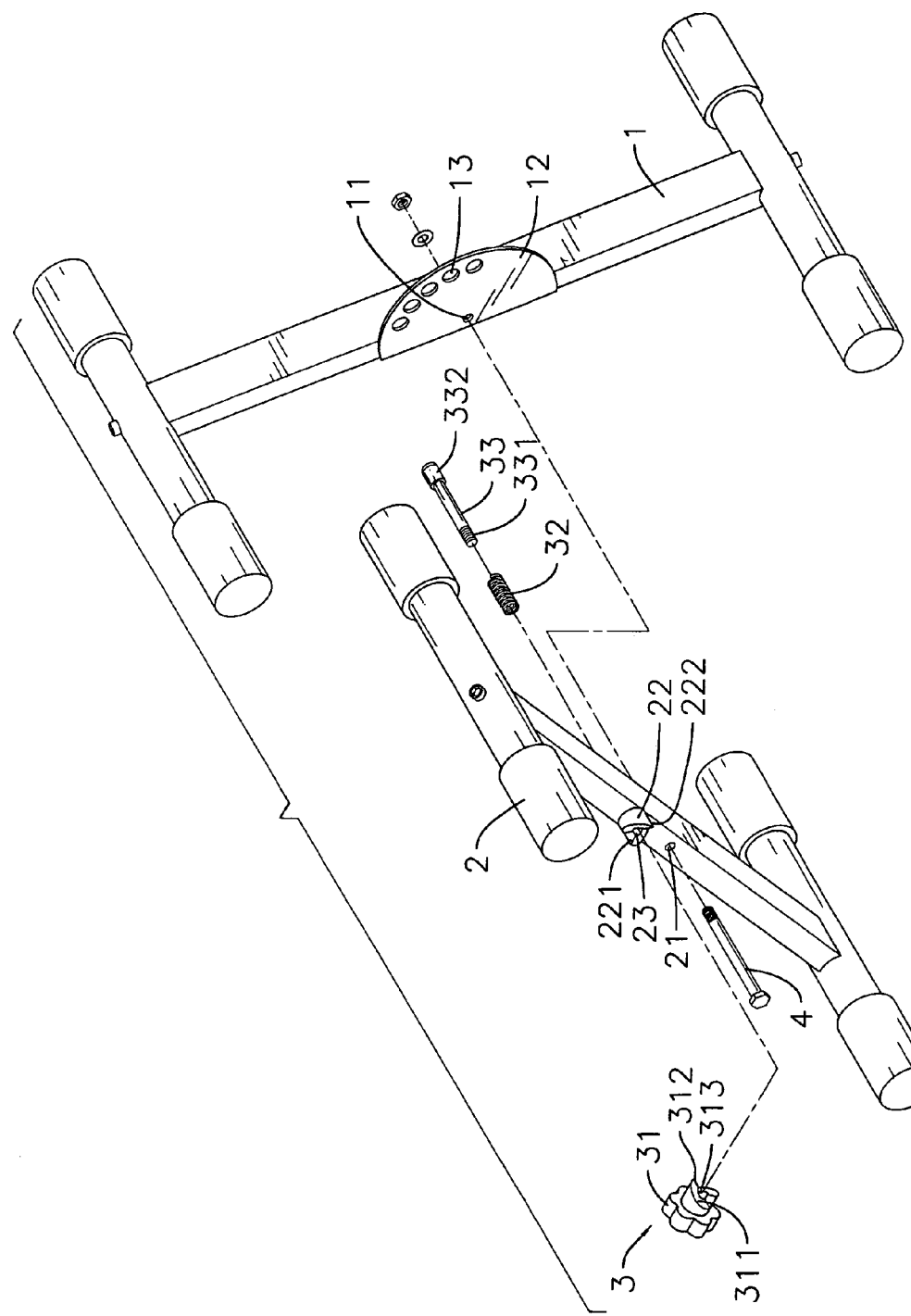
FIG. 2 is an exploded perspective view of the support for a musical keyboard instrument in FIG. 1.

With reference to FIGS. 1-2, a support for a musical keyboard instrument is composed of a first leg (1), a second leg (2), an adjuster (3) and an axle (4).

The first leg (1) has a first hole (11) defined in a middle portion thereof, and a semi-circular disk (12) is provided on a side of the first leg (1). Multiple openings (13) are evenly defined along a periphery of the disk (12) in a radial pattern.

The second leg (2) has a second hole (21) defined in a middle portion thereof, and a rod (22) is transversely formed through a side of the second leg (2) and adjacent to the second hole (21). A sleeve is disposed inside of the second leg. Two first spiral surfaces (221) are respectively formed in a free end of the rod (22) and face each other. The spiral surfaces (221) are respectively inclined to the rod (22) and have two first stopping sidewalls (222) formed on an end thereof and perpendicular to an extending direction of the second leg (2). An orifice (23) is defined through both the rod (22) and the sleeve within the second leg (2) and the diameter of a first segment of the orifice (23) in the rod (22) is slightly smaller than that of a second segment of the orifice (23) in the second leg (2).

The adjuster (3) is mounted next to rod (22), and has a knob (31), a spring (32) and a bar (33) connected to the knob (31). Two second spiral surfaces (311) are respectively formed on an end of the knob (31). The second spiral surfaces (311) are respectively slanted relative to a surface of the knob (31) and each have a second stopping sidewall (312) formed in an end thereof and perpendicular to the knob (31), and parallel to the first spiral surfaces (221). An aperture (313) is defined in a center of the knob (31). A head (332), the diameter of which is slightly bigger than that of other portions of the bar (33), is formed in a first end of the bar (33). A threaded portion (331), which is formed in a second end of the bar (33), is inserted into the spring (32) and the orifice (23) in turn, and screwed into the aperture (313). The second spiral surfaces (311) are respectively engaged with the first spiral surfaces (222). A first end of the spring (32) is mounted in the first segment of the orifice (23) with a small diameter and a second end of the spring (32) abuts the head (332). The head (332) selectively engages in one of the openings (13).

The axle (4) is inserted into the second hole (21) and the first hole (11) so that the first leg (1) is pivotally connected to the second leg (2).

Figure 3:
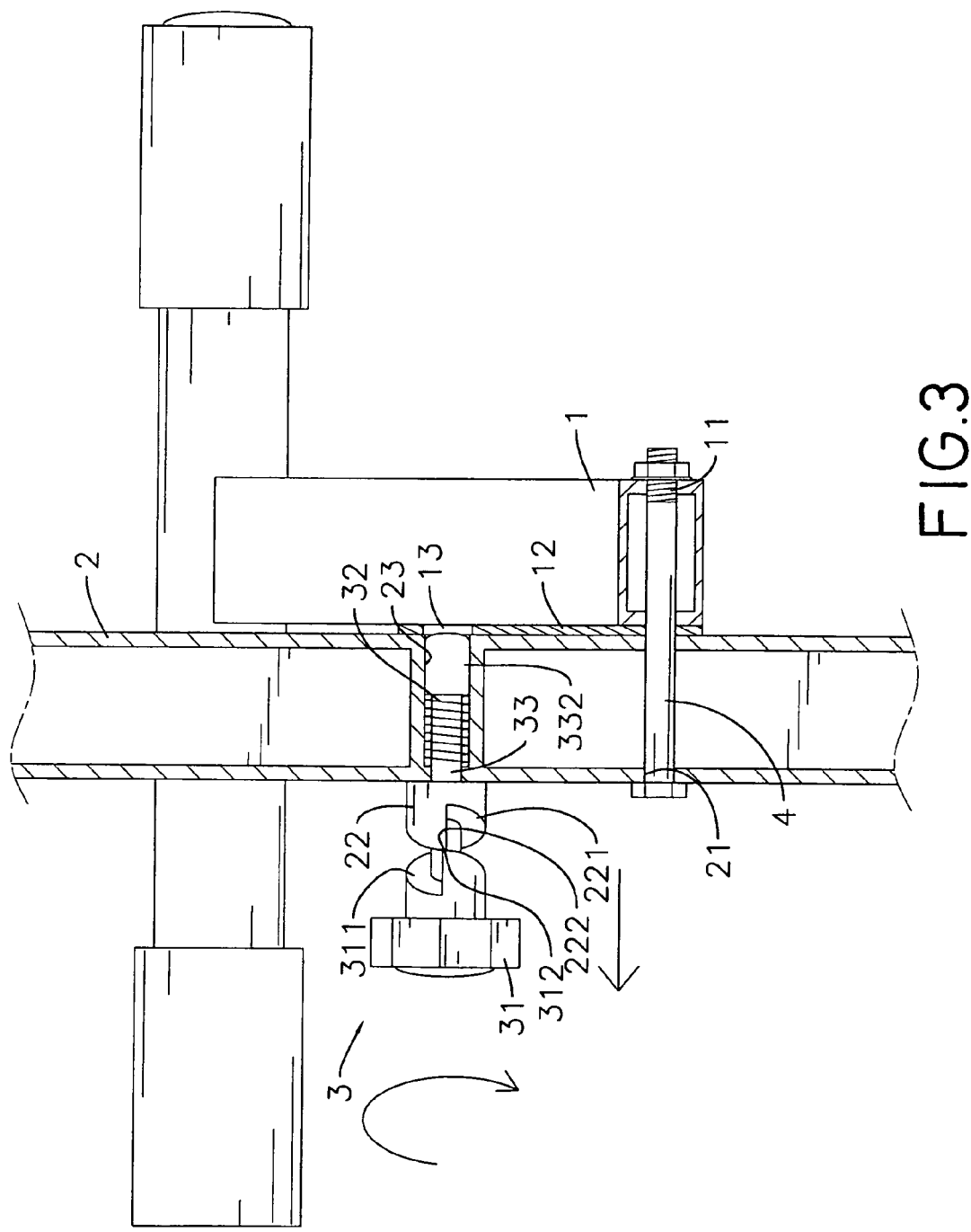
FIG. 3 is an operational side view in partial section of the support for a musical keyboard instrument in FIG. 1.
Figure 4:
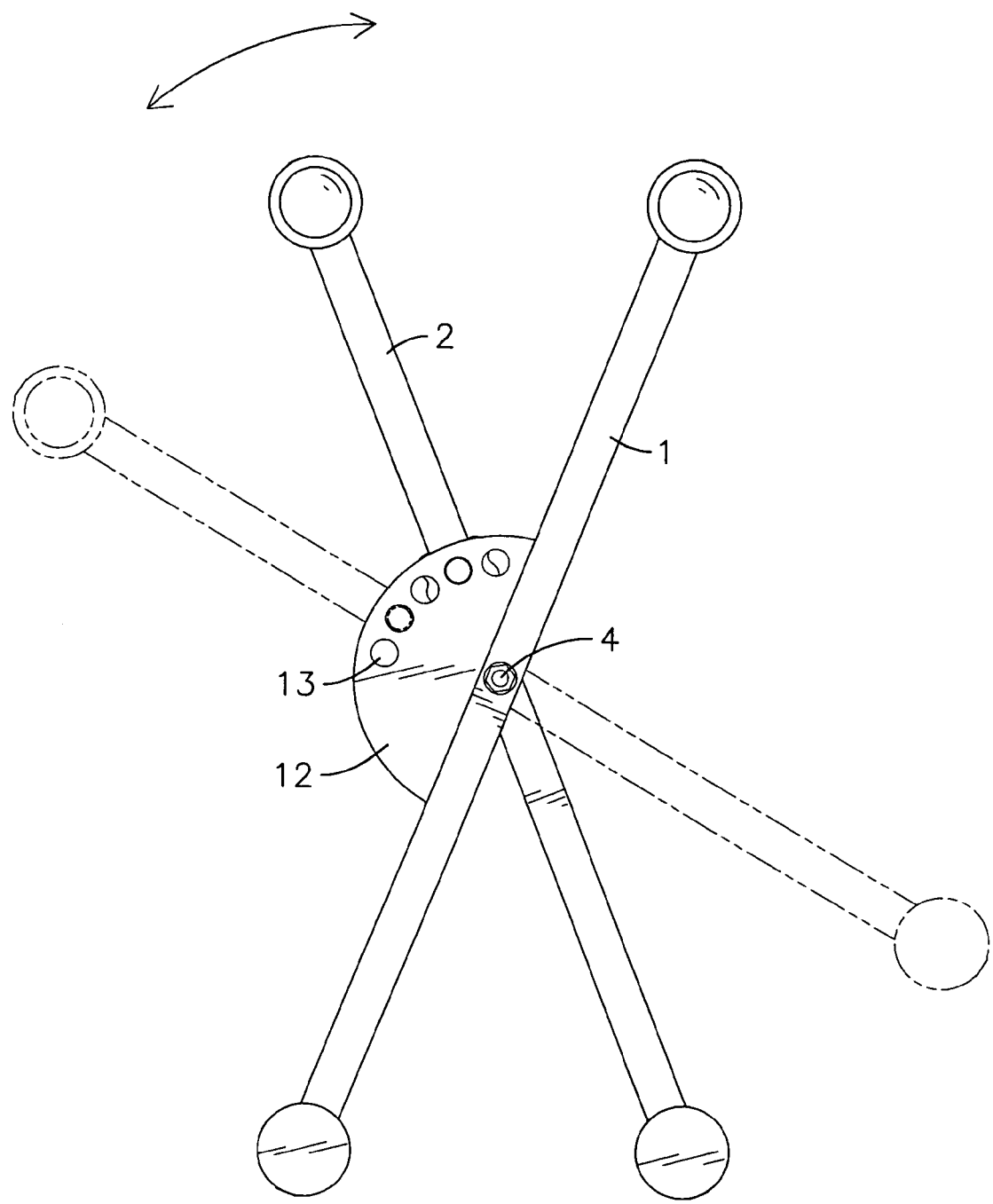
FIG. 4 is an operational front view of the support for a musical keyboard instrument in FIG. 1.

With further reference to FIG. 3, when in use, the knob (31) is pulled out and rotated in a first direction. The head (332) is withdrawn from the opening (13). The spring (32) is pressed by the head (332), which is received in the orifice (23). The second stopping sidewall (312) is locked by the first stopping sidewall (222) holding the head (332) within the orifice (23). With further reference to FIG. 4, the first leg (1) can be adjusted relative to the second leg (2) to adjust the present invention to a desired position.

Figure 5:
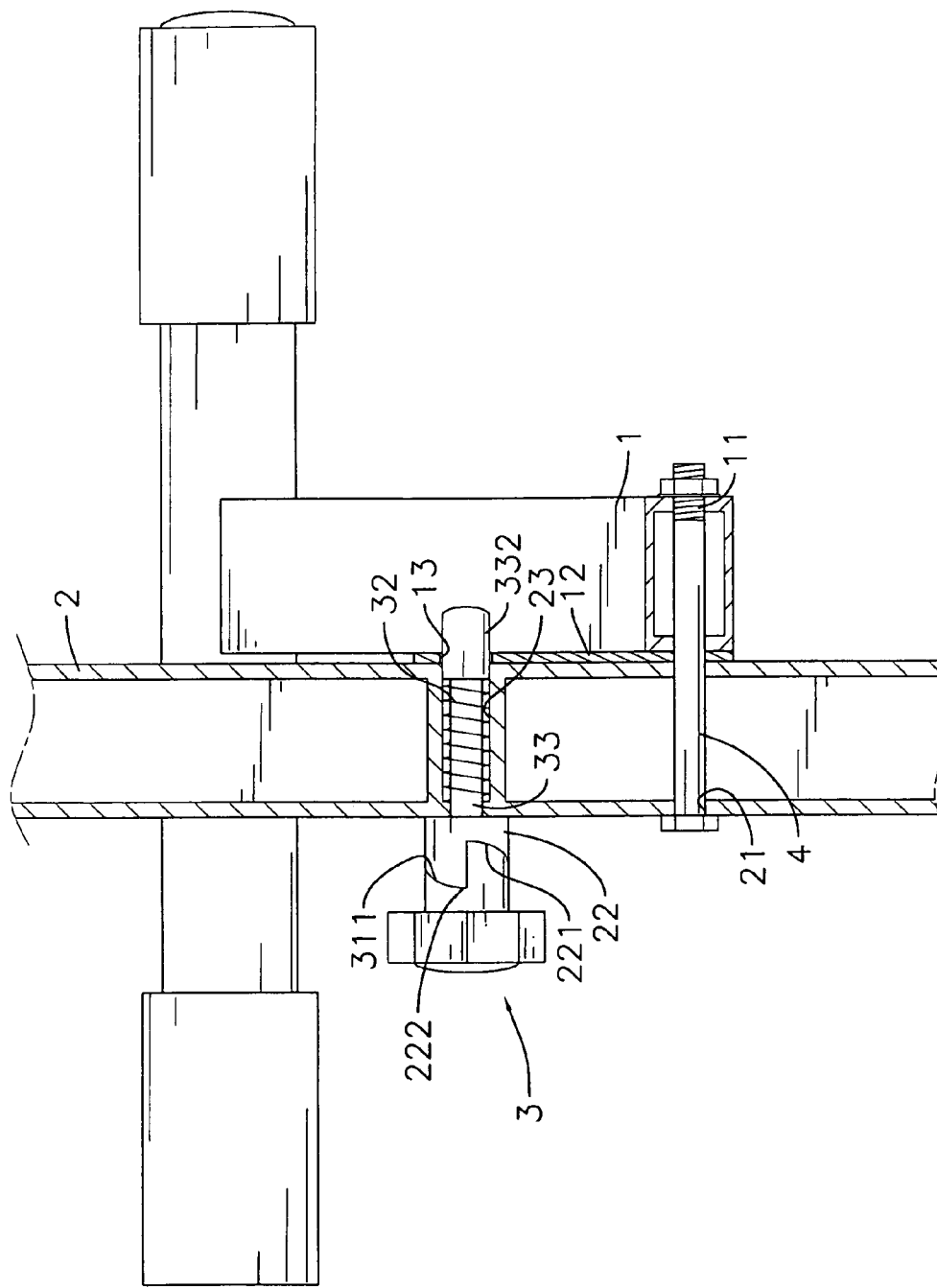
FIG. 5 is a side view in a partial section of the support for a musical keyboard instrument in FIG. 1.
Figure 6:
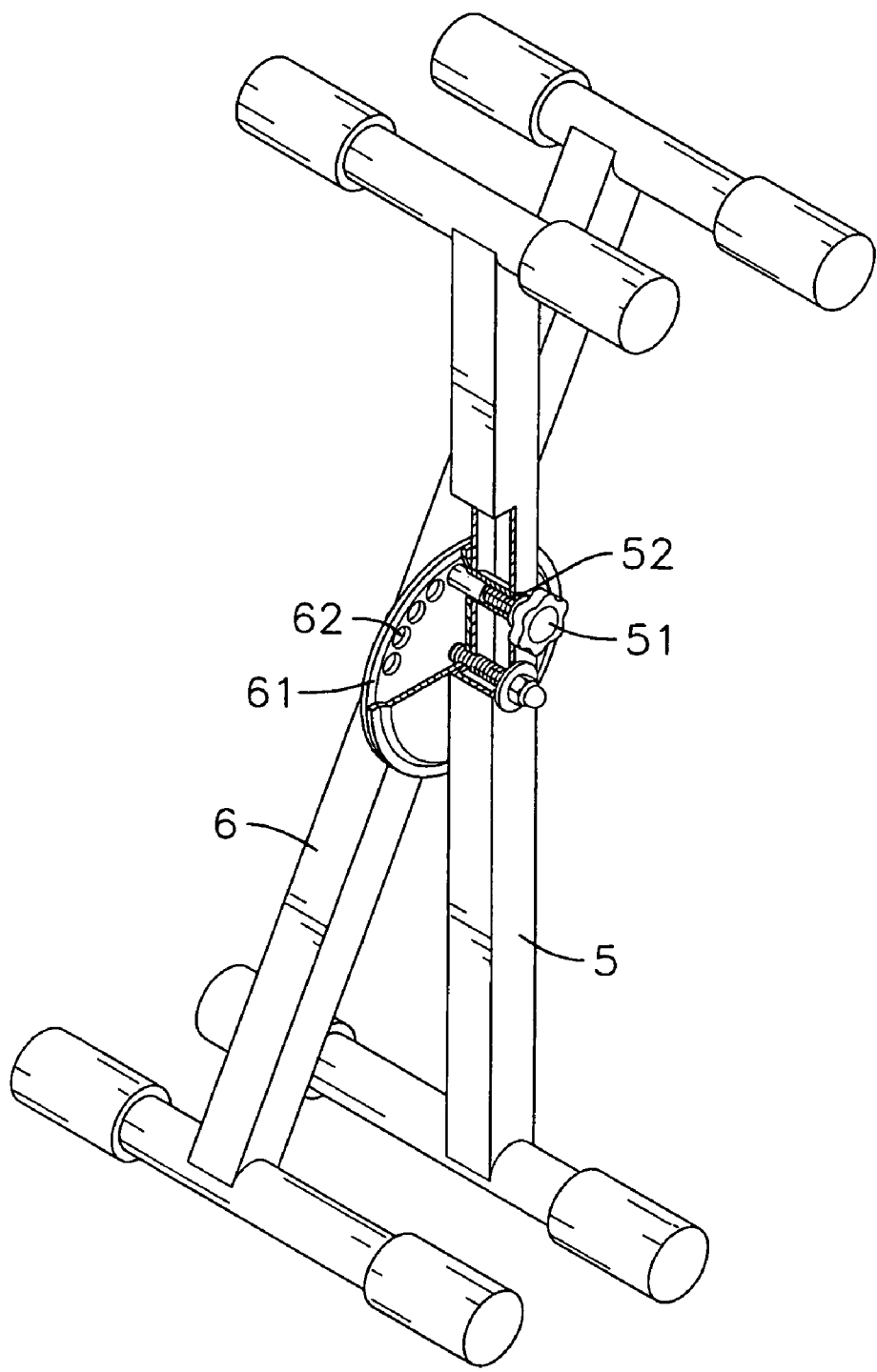
FIG. 6 is a perspective view of a conventional support for a musical keyboard instrument.

With reference to FIG. 5, when the second stopping sidewall (312) is engaged with the first stopping sidewall (222) via the knob (31) being rotated in a second direction, the head (332) is pushed out of the orifice (23) by the resilient force of the spring (32) and inserted into one of the openings (13) so that the first leg (1) can be locked to the second leg (2). Hence, it is easy for just one user to adjust the present invention because the knob (31) can be positioned in the first or the second direction to hold the head (332) out of the opening (13).

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A support for a musical keyboard instrument comprising:
   a first leg having a semi-circular disk securely provided on a side thereof, the disk having multiple openings evenly defined along a periphery thereof, and in a radial pattern;
   a second leg pivotally connected to the first leg, and having first and second aligned openings respectively formed in opposing sidewalls of the second leg, the first opening having a diameter that is smaller than a diameter of the second opening, the second leg further having a sleeve disposed therein, and extending from the first opening to the second opening, the sleeve having an inside diameter that is the same as the diameter of the second opening, the second leg further having a rod formed on the sidewall having the first opening, the rod having two first spiral surfaces respectively formed at a free end thereof and facing toward each other and slanted to the side wall of the second leg, the rod further having two first stopping sidewalls respectively formed in sidewalls of the first spiral surfaces, the rod having an orifice extending therethrough, the orifice being disposed in alignment with the first opening; and
   an adjuster mounted between the first and second leg and having a knob having two second spiral surfaces respectively formed in a free end of the knob and engaged with the first spiral surfaces, and two second stopping sidewalls respectively formed in sidewalls of the second spiral surfaces, a spring received into the sleeve, and a bar connected to the knob and having a head engaged with one of the openings in the semi-circular disk and formed in a first end of the bar, and a second end of the bar opposite to the first end of the bar and inserted into the spring and the orifice and securely connected to the knob.

2. The support for a musical keyboard instrument as claimed in claim 1, wherein a threaded portion is formed in the second end of the bar and an aperture is defined in the knob whereby the threaded portion is engaged with the aperture.

3. The support for a musical keyboard instrument as claimed in claim 1, wherein the diameter of the head is slightly bigger than that of other portions of the rod.

4. The support for a musical keyboard instrument as claimed in claim 1, wherein the spring is disposed in the sleeve, with one end of the spring abutting against the sidewall having the first opening, and another end of the spring abutting against the head.

5. The support for a musical keyboard instrument as claimed in claim 1, wherein the first stopping sidewalls are respectively provided perpendicular to the sidewall of the second leg and the second stopping sidewalls are respectively provided perpendicular to a surface of the knob.

* * * * *